United States Patent [19]

Korman

[11] Patent Number: 4,525,736
[45] Date of Patent: Jun. 25, 1985

[54] SELECTIVE COLOR MODIFICATION

[75] Inventor: Nathaniel I. Korman, Princeton, N.J.

[73] Assignee: Ventures Research & Development Group, Albuquerque, N. Mex.

[21] Appl. No.: 417,345

[22] Filed: Sep. 13, 1982

[51] Int. Cl.³ ............................................. H04N 9/535
[52] U.S. Cl. ........................................ 358/28; 358/27; 358/29; 358/40; 358/37
[58] Field of Search ....................... 358/22, 27, 28, 29, 358/37, 40, 80

[56] References Cited

U.S. PATENT DOCUMENTS 4,266,242  5/1981  McCoy ................................... 358/22
4,357,624  11/1982  Greenberg ............................. 358/22
4,393,398  7/1983  Horiguchi ............................. 358/80

Primary Examiner—Michael A. Masinick

[57] ABSTRACT

An apparatus and method for the modification of the color of television pictures in arbitrarily selected regions of the color space and of the picture. A region within which color modification is to take place is defined by establishing the bounds, or limits for the region. Apparatus is described by which a determination can be made whether any given picture element lies within the region. For those picture elements which lie within the region, modification voltages are added to the television signals to accomplish the desired color modifications. Display apparatus is described which facilitates setting of proper bounds for the color modification region.

14 Claims, 3 Drawing Figures

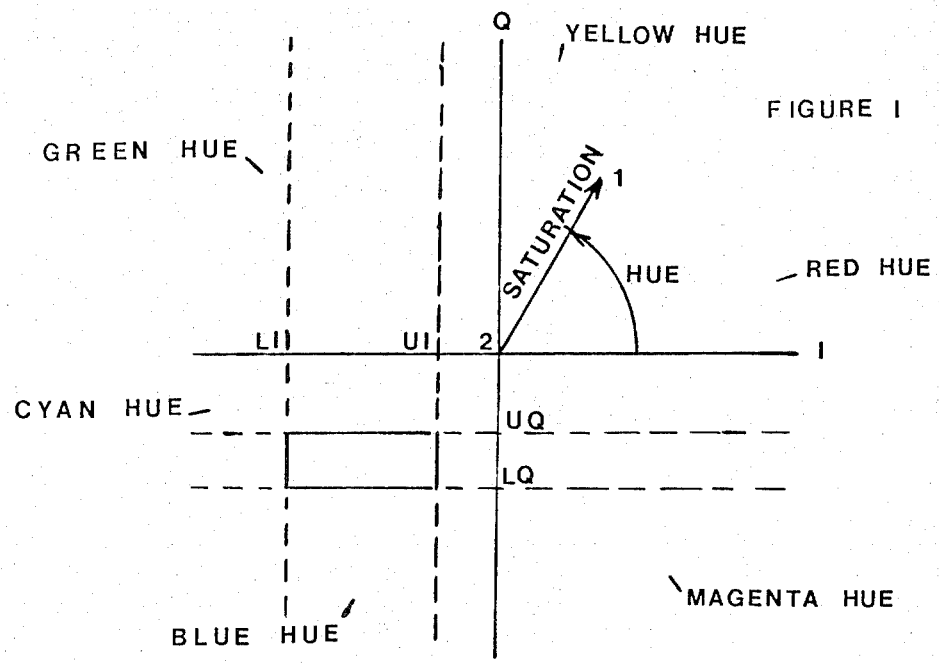
FIGURE I
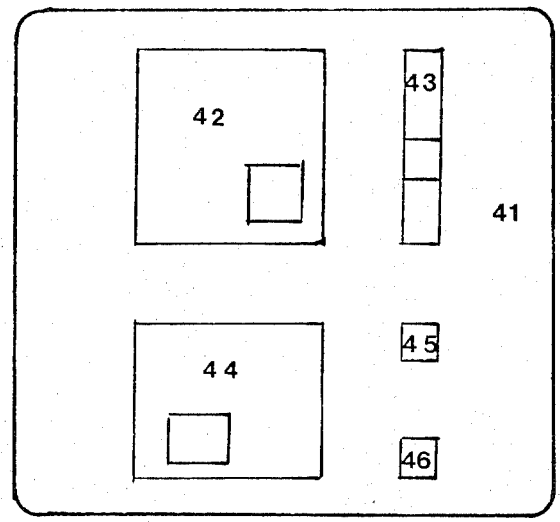
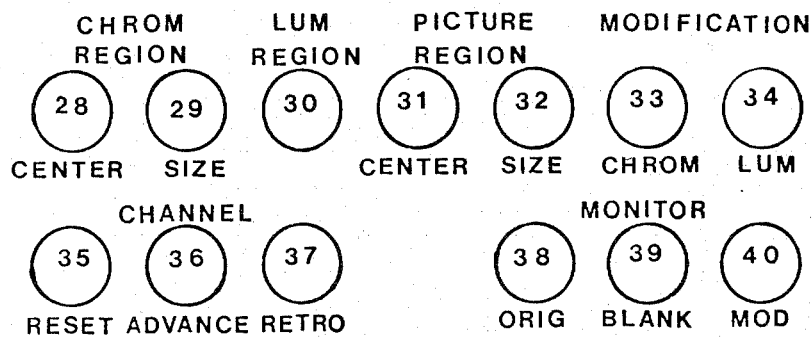
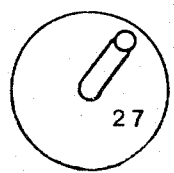
FIGURE III

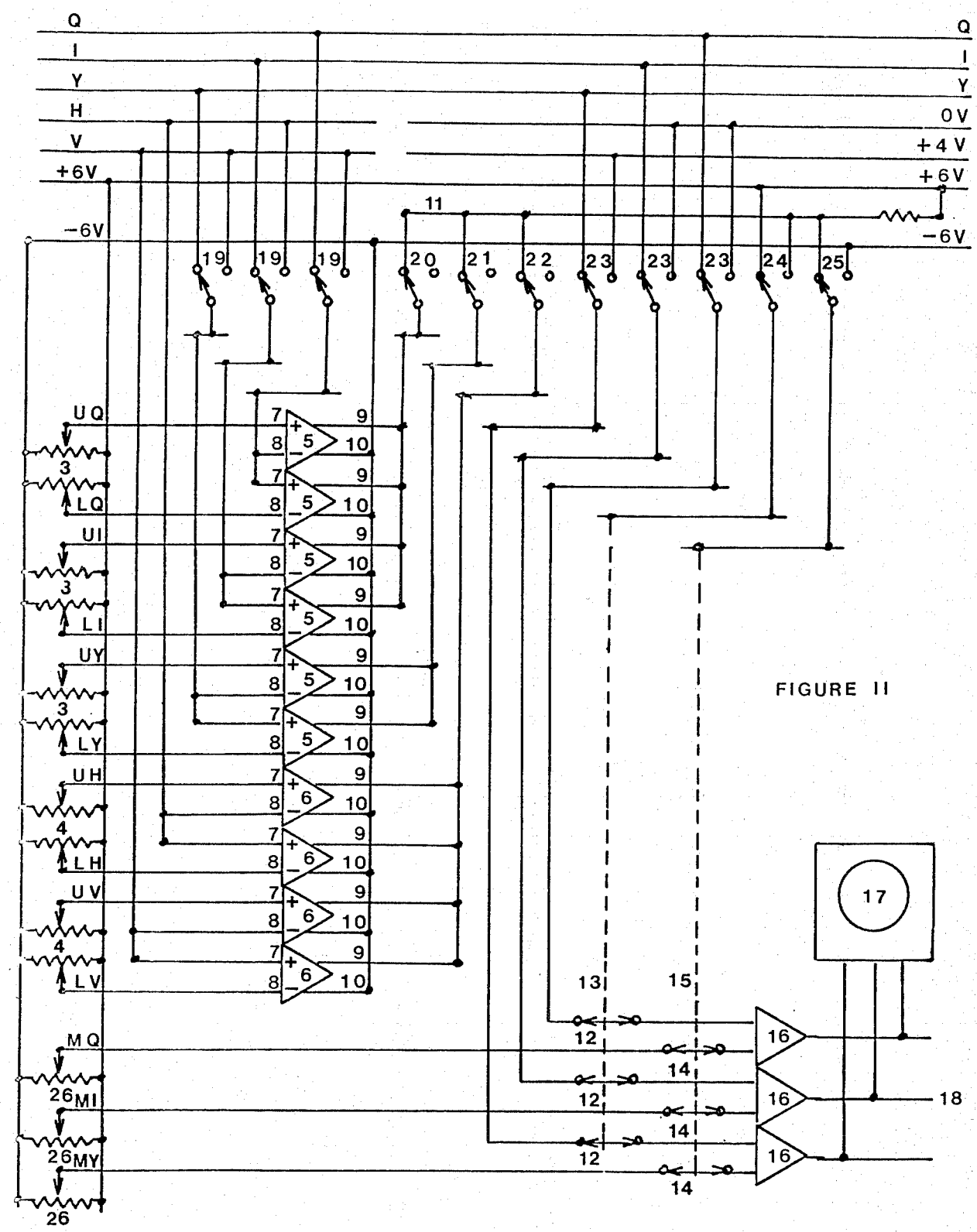
FIGURE II

SELECTIVE COLOR MODIFICATION

FIELD OF THE INVENTION

This invention relates to the reproduction of color pictures by electronic means such as are utilized in television and in scanners used in making color separations for the printing industry.

DESCRIPTION OF THE PRIOR ART

In color television and in color printing, it is sometimes desirable to selectively modify certain chosen colors without affecting others. Heretofore, this capability has been provided by a non-linear matrix device invented by Monahan et al, U.S. Pat. No. 3,558,806. The Monahan invention has been implemented and made available to the industry by the RCA Corporation in a device known as the Chromacomp and also by the Philips Audio Video Systems Corporation in a device known as the Variable Matrix. These devices permitted independent adjustment of the hue and saturation for each of the six primary and secondary hues: red, cyan, green, yellow, blue and magenta. In other words, the chrominance plane is divided into six sectors, each centered on the aforesaid hues; within each sector, the hue and saturation of the colors lying within that sector can be altered without affecting color lying outside that sector. With the non-linear matrix device invented by Monahan it is not possible to change the color of one object whose color lies within one segment of the chrominance plane without affecting the color of other objects in that segment. Moreover, because the color of a given object usually is represented by an area in the chrominance plane and not just a single point, and because that area may lie in two or more adjacent segments, adjustment of the color of that object may require coordinated adjustments in the adjacent segments. While this can be done, it presents some difficulty to the colorist operating the equipment.

SUMMARY OF THE INVENTION

This invention provides a capability for modification of both the luminance and chrominance of the colors in an arbitrarily selected region of the color space while not affecting the colors outside that region; the selected color space region may further be delimited to an arbitrarily selected region of the picture itself. This modification capability can be applied independently in a multiplicity of regions.

In order to guide the colorist in his choice for the location, shape and size for any of the color modification regions, this invention provides several cathode ray tube displays. In one of these displays the monitor scope, which normally displays either the original picture or the modified version, can be blanked out except in the region selected for modification. In another of these displays the monitor scope, or its equivalent, shows the area in the chrominance plane of the color modification region. In still another of these displays the monitor scope, or its equivalent, shows the extent along the luminance axis of the color modification region.

In the television industry there is a particular need for color modification of picture material which is stored on color film. Typically, this material is a composite of a number of scenes, each scene requiring independent modification. Because of the rapidity with which one scene changes to the next, scene-by-scene instructions for color modification are stored in a digital computer and applied automatically as the scenes change. This technology has been described in U.S. Pat. Nos. 3,610,815, 3,637,920 and 4,096,523. This invention can also be implemented in such computer controlled systems; when so implemented, some of the functions which would otherwise be implemented in apparatus can be handled by computer software.

In color television systems, the color signals change too rapidly for digital computer processing and storage; the digital computer is limited to processing and storing control signals. However, color separation scanners for the printing industry can be implemented in such a way that the color signals pass through the computer and may be processed and stored in digital form. Such a digital computer-scanner has been described in U.S. Pat. No. 3,612,753. This invention can be implemented in such systems, where the color signals are in digital form and accessible to a digital computer; when so implemented, many of the functions which would otherwise by implemented in apparatus can be handled by computer software.

BRIEF DESCRIPTION OF THE DRAWINGS

This invention is described in greater detail by reference to the Figures.

FIG. I depicts the chrominance plane.

FIG. II depicts the basic embodiment of this invention.

FIG. III depicts an embodiment of the control aspects of this invention when used with a digital computer.

DESCRIPTION OF THE PREFERRED EMBODIMENTS

In color television systems, three signals, Red, Green and Blue are generated by three camera tubes, each viewing the same picture but through red, green and blue filters respectively. In order to provide compatibility with monochrome reception and to facilitate transmission, the Red, Green and Blue signals are transformed into signals Y, I and Q. Upon reception the Y, I and Q signals are transformed back into Red, Green and Blue signals which are then used to excite the corresponding picturetube phosphors. These transformations are referred to as "matrixing" and are well known to those skilled in the art.

The color of any picture element, thus, has three attributes, e.g., Red, Green Blue or Y, I, Q, and may be thought of as being represented by a point in a three dimensional color space. The coordinates in that space may be taken as Red, Green, Blue or alternatively as Y, I, Q. Matrixing is equivalent to a change in the coordinate system. The Y, I, Q coordinate system is of particular interest because it corresponds with the human perception of color. Y corresponds with the luminance or brightness of a color; the I and Q axes lie in a plane of constant luminance. This plane is known as the chrominance plane and is depicted in FIG. I. Radial distance of the color point, 1, from the origin, 2, on this plane is known as saturation; angular position is known as hue. The angular positions of the primary and secondary hues, red, green, blue and cyan, magenta, yellow are shown on the periphery of FIG. I. The chrominance boundaries of a typical region selected for color modification are shown at UI, LI, UQ and LQ. The corresponding boundaries for the region along the luminance axis are designated as UY and LY but are not depicted in FIG. I.

The colorist, the person operating an equipment embodying this invention, selects the boundaries of the region within which he intends to make a color modification by setting the bank of potentiometers, 3, shown in FIG. II. If the equipment permits further delimitation of the region to a specified area of the picture by the inclusion of potentiometer bank, 4, and its associated comparators, 6, he would also set potentiometers, 4. This act of setting the potentiometers establishes voltage levels which correspond with the region boundaries UI, LI, UQ, LQ, UY, LY, UH, LH, UV, LV, respectively.

The banks of comparators 5 and 6 determine whether the color signals Y, I, Q on the one hand, and whether the deflection signals H, V on the other hand, lie within the region selected. The comparators depicted here are commercially available under the designation LM319. They have what is termed "open collector output", i.e., if the voltage at the + input 7 exceeds the voltage at the − input 8, the condition at the output 9 relative to the reference terminal 10 will be an open circuit; if the voltage at the + input 7 does not exceed the voltage at the − input 8, the condition at the output 9 relative to the reference terminal 10 will be a short circuit. Thus, if, and only if, all three color signals lie within the boundaries of the selected region:

$$UY<Y<LY \text{ and } UQ<Q<LQ \text{ and } UI<I<LI \text{ and } UH<H<LH \text{ and } UV<V<LV$$

where H is the signal voltage corresponding to the horizontal coordinate of a point in the picture
where V is the signal voltage corresponding to the vertical coordinate of a point in the picture
then the gate signal 11 will be at a level of plus six volts. If, on the other hand, any of the three color signals Q, I, Y, or any of the two coordinate signals H, V, lie outside the boundaries of the selected region, one or another of the comparator output terminals 9 will be short circuited to the reference terminal 10 and the gate signal 11 will be at a level of minus six volts. The electronic switches at 12 and 14, which are typified by the commercially available unit designated as the CD4066A, will be in the closed position shown when the respective control members 13 and 15 are at a potential of +6 volts; but they will be open when the control members 13 and 15 are at a potential of −6 volts.

Control switches 19–26 which can be operated either manually or remotely by means of relays, control the picture to be displayed on the monitor scope 17 and to be available for recording or transmission at 18. Table I lists the monitor scope pictures as a function of the settings of control switches 19–25. Thus, for the unmodified picture to appear on the monitor scope 17, switches 23 and 24 are put in the left position, switch 25 is put in the right position; as a result electronic switch 12 will be closed, electronic switch 14 will be open, and the Q,I,Y signals alone will appear at the input to the summation amplifiers 16 and upon the monitor scope 17.

For a modified picture to appear on the monitor scope 17 and to be available for transmission or recording at 18, the switches 19–25 are set in accordance with line 2 of Table I. If the color signals Q,I,Y or the location V,H in the picture plane are outside the selected modification region, gate signal 11 will be at a potential of −6 volts, electronic switch 12 will be closed, electronic switch 14 will be open, only Q,I,Y will appear at the summation amplifiers 16 and on monitor scope 17. On the other hand, if the color signals Q,I,Y and the location V,H in the picture plane are inside the selected modification region, gate signal 11 will be at a potential of +6 volts, both electronic switches 12 and 14 will be closed, the color modification voltages MQ, MI, MY will be added to the unmodified color signals Q,I,Y in the summation amplifiers 16, and the modified color will appear on the monitor scope 17 and be available for recording or transmission at 18. At this point the colorist can alter the color within the modification region at will by adjusting the modification potentiometer bank 26.

TABLE I

| Line | \multicolumn{7}{c}{Switch Positions} | Monitor Scope Display |
| --- | --- | --- | --- | --- | --- | --- | --- | --- |
| | 19 | 20 | 21 | 22 | 23 | 24 | 25 | |
| 1 | * | * | * | * | Lt | Lt | Rt | Unmodified picture |
| 2 | Lt | Lt | Lt | Lt | Lt | Rt | Lt | Modified picture |
| 3 | Lt | Lt | Lt | Lt | Lt | Rt | Lt | Picture blanked except in modification region |
| 4 | Rt | Lt | Rt | Rt | Rt | Rt | Rt | Extent of modification region in chrominance plane |
| 5 | Rt | Rt | Lt | Rt | Rt | Rt | Rt | Extent of modification region along luminance axis |
| 6 | * | Rt | Rt | Lt | Rt | Rt | Rt | Extent of modification region in picture plane |

\* = Either
Lt = Left
Rt = Right

The system depicted in FIG. II is based upon analog type comparators, switches and summation amplifiers. However, digital equivalents of these elements are commonly available and can be used instead of their analog counterparts. For example, SN74LS85 digital comparators can be used to provide comparator action on digital signals; SN74LS157 data selectors can be used as switches for digital signals; SN74LS83 binary adders can be used to add digital signals. One or more of these digital type devices could be used in place of the corresponding analog device of FIG. II. If digital switching alone were to be employed using SN74LS157s, the color modification signals would be supplied to it in digital form and the switch outputs would be converted to analog form by digital-to-analog converters such as the DAC-08. If digital comparators and summation amplifiers such as the SN74LS85 and the SN74LS83 were to be used in addition, the color video signals as well as the control voltages would be supplied in digital form. The MATV-0811 is an example of a state-of-the-art device for converting normal analog video voltages into digital form.

The system depicted in FIG. II is capable of modifying color in only one selected region. By additional banks of potentiometers 3, 4, 26, additional banks of comparators 5, 6, additional electronic switches 12, 14, and by appropriate changes in switches 19–25, a multiplicity of regions can be established and independent color modifications made in each region.

In addition, Red, Green, Blue instead of Q,I,Y signals may be operated upon while correction and control can be exerted in terms of Q,I,Y. This can be accomplished by the use of appropriate matrixing circuits to transform the voltage levels from potentiometer banks 3, 4, 26 into the Red, Green, Blue equivalents. Moreover, for convenience to the colorist, the upper and lower boundaries to a region may be obtained by the addition and subtraction of voltages derived from controls specifying window parameters; window parameters being the mean and difference of the upper and lower boundaries.

In the foregoing description relating to FIG. II, the color space region and the picture plane region, which are described in terms of upper and lower boundaries for Q, I, Y, V and H, are a rectangular parallelopiped in color space and a rectangle in the picture plane. These particular shapes for the regional boundaries result not only from the fact tht Q, I, Y, V and H are rectangular coordinate systems in their respective spaces but also from the particular circuitry chosen for illustration. Alternative shapes for the regional boundaries are possible. For instance, a region in color space with ovoid boundaries and a region in the picture plane with oval boundaries could be implemented with hardware or software no more complicted to design or build than that required for regions with rectangular boundaries. The size and location of these regions would still be defined by the same upper and lower boundaries for Q, I, Y, V and H; these are now recognized to be values of these coordinates at the intersection of the regional boundaries with the coordinate axes.

Some of these circuit elaborations may become inordinately extensive and the large number of controls may become conducive to operating errors. In that case, a digital computer may be used advantageously to reduce the amount of circuitry and the number of controls. FIG. III illustrates how control may be exerted by means of a digital computer; it depicts a typical control panel. Only one joystick control, 27, is employed. The joystick function is determined by which one of the control buttons 28-34 is depressed; these functions are listed in Table II.

TABLE II

| Button | Joystick Function |
|---|---|
| 28 | Move center of modification region ih chrominance plane |
| 29 | Change dimensions of modification region in chrominance plane |
| 30 | Change center and extent of modification region along luminance axis |
| 31 | Change center of modification region in picture plane |
| 32 | Change dimensions of modification region in picture plane |
| 33 | Change chrominance correction in modification region |
| 34 | Change luminance correction in modification region |

At most, only one of the control buttons may be depressed at a given time, the one depressed being indicated by backlighting. The joystick 27 can be moved up or down, right or left. The up-down component of motion controls a multiple position switch; the right-left component of motion controls another multiple position switch. In operation, the joystick 27 controls the rate and direction with which the computer is to change the function designated by the depressed control button. For instance, if control button 28 has been depressed, the position of joystick 27 will be interpreted by the computer as an order to move the color modification region in the chrominance plane; if joystick 27 is in its center position there will be no motion; if off center the color modification region will move in the direction that the joystick 27 is displaced and at a rate proportional to the distance that the joystick 27 is displaced from the center. The computer, by sensing the switch closures actuated by the control buttons 28-34 and the joystick 27, makes all of the necessary computations to change the color modification region boundaries. Buttons 35-37 enable the colorist to select the color modification channel by depressing the appropriate button momentarily. Button 35 resets the channel number to one; button 36 advances the channel number by one; button 37 decreases the channel number by one. Buttons 38-40 enable the colorist to select the picture to be displayed on the monitor scope. Only one of these buttons may be depressed at a given time, the one being depressed being indicated by backlighting.

Since the control panel described by reference to FIG. III operates, in the main, by instituting changes, it is most desirable that the colorist be given displays which depict the current situation. While this can be provided largely by the monitor scope 17 as described earlier, it may be preferable to confine the monitor scope to showing only the original, blanked and corrected pictures, and to provide another scope display as at 41 on FIG. III. Scope 41 shows the selected region on the chrominance plane 42, the selected region along the luminance axis 43, the selected region on the picture plane 44, the number of the current channel 45, and the total numbers of channels in current use 46.

The computer software and hardware necessary to implement the functions described in connection with FIG. III are well known to those skilled in the art of computer systems and need not be elaborated upon.

I claim:

1. A color modification system for color television pictures, said pictures being represented by three color signals corresponding, respectively, to the three attributes of a color, wherein there are:
   means for controlling three modification amounts, one for each of the three color signals,
   means for controlling upper and lower boundaries for each of the three color signals,
   means for finding when the three color signals simultaneously lie within their respective upper and lower boundaries, and
   means for adding the three modification amounts to each of the three color signals, respectively, only when the three color signals are found to lie simultaneously within their respective upper and lower boundaries.

2. The color modification system of claim 1 wherein the said color attributes and the said modification amounts and the said boundaries are all in terms of red green and blue.

3. The color modification system of claim 1 wherein the said color attributes and the said color modification amounts and the said boundaries are all in terms of luminance I and Q.

4. The color modification system of claim 1 wherein the said color signals are red green and blue, and wherein the said color modification amounts controlled and the said boundaries controlled are in terms of luminance I and Q, and wherein there are:
   means for calculating red green and blue modification amounts for addition to the said color signals from the said color modification amounts controlled in terms of luminance I and Q, and
   means for calculating red green and blue upper and lower boundaries for the said color signals from the said upper and lower boundaries controlled in terms of luminance I and Q.

5. The color modification system of claim 1 wherein those portions of the picture to be modified are displayed by providing:
 means for blanking out all parts of the picture for which the said color signals do not all simultaneously lie within their respective boundaries.

6. The color modification system of claim 1 wherein the said upper and lower boundaries are provided by:
 means for calculating said upper and lower boundaries from window parameters, and
 means for controlling said window parameters, said window parameters being the mean and difference of the said upper and lower boundaries.

7. The color modification system of claim 1 wherein said upper and lower boundaries and said modification amounts are controlled by the signals from a digital computer.

8. The color modification system of claim 7 wherein a sequence of television pictures represent a multiplicity of scenes in sequence and wherein there are:
 means for changing the boundaries and modification amounts at the start of each scene.

9. A color modification system for color television pictures, said pictures being represented by three color signals corresponding, respectively, to the three attributes of a color, and by two position signals corresponding to location in the picture plane, wherein there are:
 means for controlling three modification amounts, one for each of the three color signals,
 means for controlling upper and lower boundaries for each of the three color signals,
 means for controlling upper and lower boundaries for each of the two position signals,
 means for finding when the three color signals and the two position signals simultaneously lie within their respective upper and lower boundaries, and
 means for adding the three modification amounts to each of the three color signals, respectively, only when the three color signals and the two position signals are found to lie simultaneously within their respective upper and lower boundaries.

10. A method for color modification of a scanned color picture, wherein there are three color attributes for each picture element, comprising the steps of:
 selecting a color space region by setting upper and lower boundaries for each of the three color attributes, and adding modifications to the said three color attributes of each of the said picture elements only for those of the said picture elements whose color attributes all lie within the said color space region.

11. A method as described in claim 10 wherein the final selection of the color space region is facilitated by viewing said color picture with all of said picture elements not lying within the said color space region blanked out.

12. A method as described in claim 10 wherein the final selection of the said color space region is facilitated by:
 viewing a chrominance plane plot and a luminance plot of the said picture, said plots displaying the location of the said color space region.

13. A method as described in claim 10 wherein for picture element there are two location attributes describing the location of the said picture element in the picture plane, and wherein:
 a picture region is also selected by setting the upper and lower bounds for each of the said two location attributes, and
 the said modifications are added to the said three color attributes only for those picture elements for which the said location attributes lie within the said picture region.

14. A method as described in claim 13 wherein the final selection of said picture region and said color space region is facilitated by viewing chrominance plane, luminance and picture plane plots of the said picture, said plots displaying the location of the said regions.

* * * * *